W. THOMAS.
Operating Canal-Lock Gate-Valves.
No. 150,445. Patented May 5, 1874.
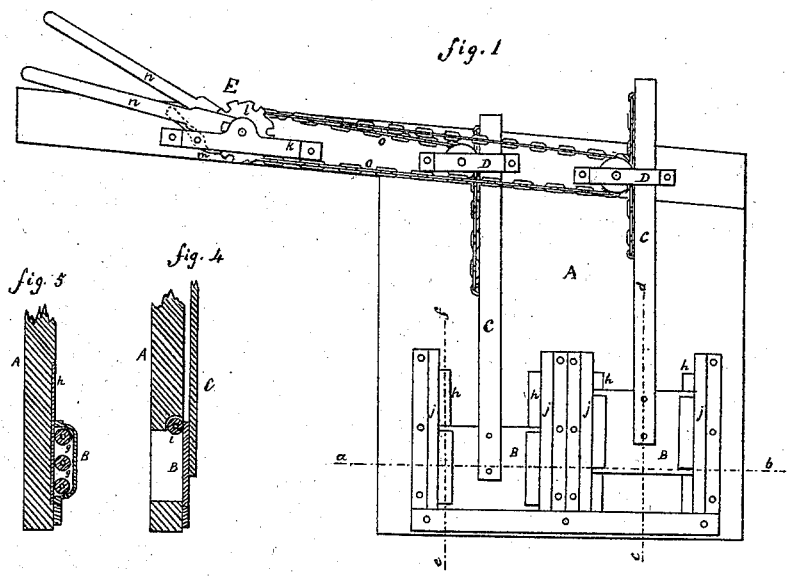
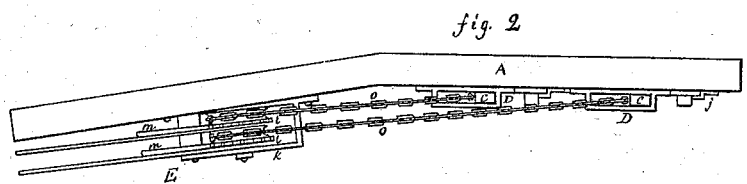
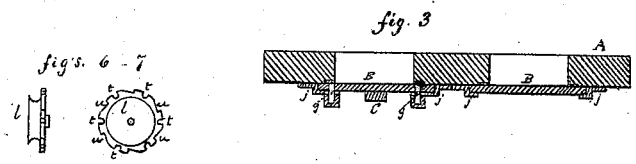
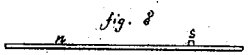
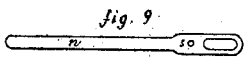
Witnesses.
E. Rose
N. J. Dickey
Inventor.
William Thomas

UNITED STATES PATENT OFFICE.

WILLIAM THOMAS, OF OTTAWA, ILLINOIS.

IMPROVEMENT IN OPERATING CANAL-LOCK GATE-VALVES.

Specification forming part of Letters Patent No. 150,445, dated May 5, 1874; application filed February 20, 1874.

*To all whom it may concern:*

Be it known that I, WILLIAM THOMAS, of Ottawa, in the county of La Salle and State of Illinois, have invented certain Improvements in Canal-Lock Gates, of which the following is a specification:

My invention consists in a novel lifting apparatus, specially adapted for raising the valves and letting them down with great ease and convenience, and in the least possible time, taking into consideration that the power of one man only is generally available for the said performance; and in the combination, with the valves of lock-gates, of said improved lifting apparatus in such a manner that both valves can be moved from the same standing-point, the operator standing always on the solid ground whenever he moves the valves.

Figure 1 is a side elevation of gate embodying my invention. Fig. 2 is a plan of the same. Fig. 3 is a horizontal section, showing those parts which are below the line $a\,b$ drawn across Fig. 1. Fig. 4 is a vertical section taken through the line $c\,d$, Fig. 1. Fig. 5 is a vertical section taken through the line $e\,f$, Fig. 1. Figs. 6, 7, 8, and 9 are detached pieces.

A is the body of the lock-gate, constructed of wood generally, the two iron valves B B covering square openings below. The valves B B have stems C C, which run through guides D D. Each valve B has attached to it, in recesses adapted to that purpose, six rollers, $g$ $g$ $g$, running on the iron ways $h\,h\,h$. There is also an iron roller, $i$, over the middle of each opening in the gate A, supporting the middle part of the valves B B. Four slides, $j\,j\,j$, hold the valves B B over the openings in the gate A. On the projecting arm of the gate A is attached the lifting apparatus E, consisting of a frame, $k$, two wheels, $l\,l$, two pawls, $m\,m$, and two levers, $n\,n$. Chains $o\,o$ pass over each of the wheels $l\,l$, and are fastened thereto by means of staples. The same chains thence pass over the pulleys inside the guides D D, and their ends are fastened by means of staples to the stems C C.

It will be seen that in turning either of the wheels $l\,l$ the corresponding valve B will be raised or lowered, each acting independent of the other. The levers $n\,n$ have a slot fitting on the hubs of the wheels $l\,l$. Each lever has also a projecting pin, $s$, which enters the notches $t\,t\,t$ in the wheels $n\,n$, when, by moving the lever $n$, the wheel $l$ is carried around, the pawls $m\,m$ falling into the notches $u\,u\,u$ in the wheels $l\,l$, retaining the wheels in position until the lever $n$ can be disengaged, and the pin $s$ be placed into a new notch, $t$. The whole performance, as will be seen, takes place on the ground, either when the lock is open or when closed, and the peculiar arrangement of the parts gives a man a good opportunity to use his power to the best advantage.

I do not claim as my invention the manner of passing a chain over the wheels $l\,l$ and over pulleys in the guides D D, as explained, being aware that this is an old device; but

What I claim is—

The lifting apparatus E, consisting of the wheels $l\,l$, having notches $t\,t\,t$ and $u\,u\,u$, and the slotted levers $n\,n$, provided with the pins $s\,s$, in combination with the valves B B, the whole being constructed and operated substantially as described.

WILLIAM THOMAS.

Witnesses:
E. ROSE,
W. T. DICKEY.